No. 803,681.  
PATENTED NOV. 7, 1905.
P. J. FAHEY.  
HOISTING APPARATUS.  
APPLICATION FILED FEB. 9, 1905.
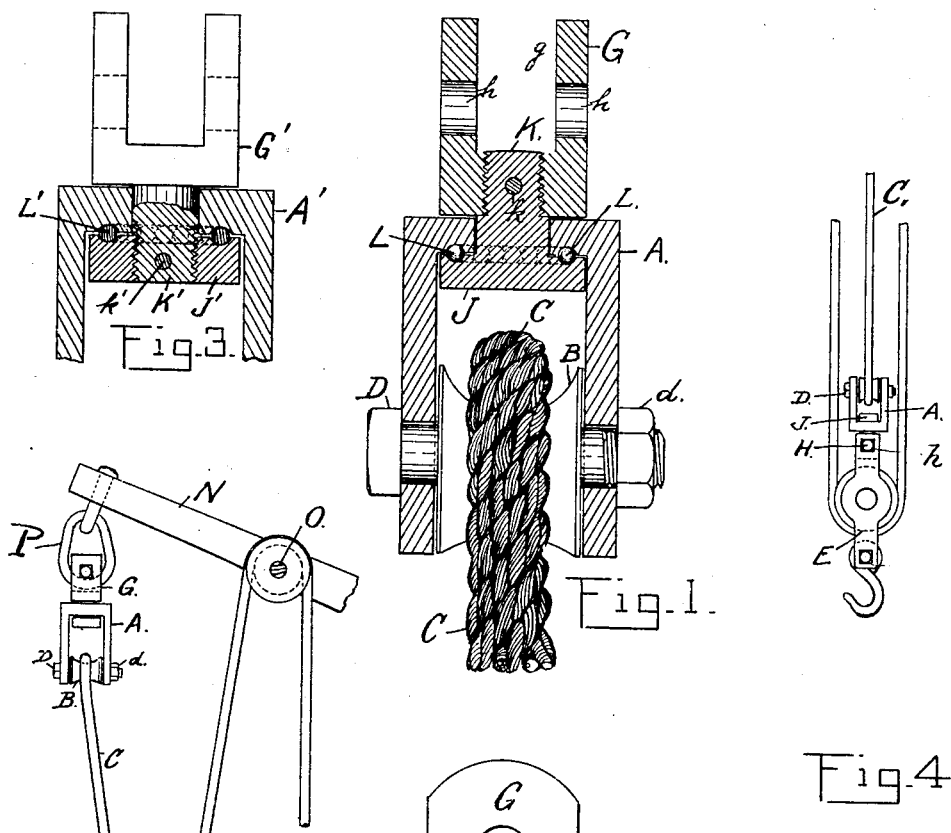
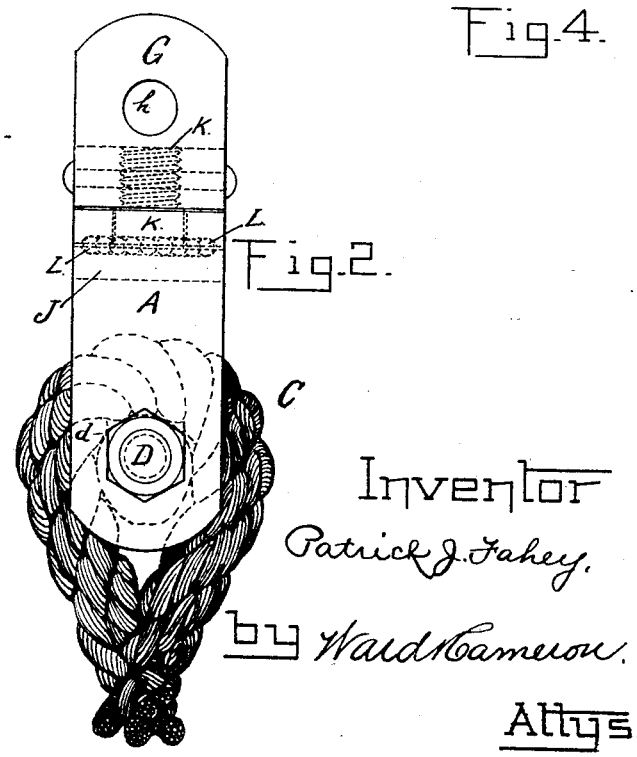
Witnesses
Inventor  
Patrick J. Fahey.  
by Ward Cameron  
Attys.

UNITED STATES PATENT OFFICE.

PATRICK J. FAHEY, OF ALBANY, NEW YORK.

HOISTING APPARATUS.

No. 803,681.  Specification of Letters Patent.  Patented Nov. 7, 1905.

Application filed February 9, 1905. Serial No. 244,839.

*To all whom it may concern:*

Be it known that I, PATRICK J. FAHEY, a citizen of the United States of America, and a resident of the city and county of Albany, State of New York, have invented certain new and useful Improvements in Hoisting Apparatus, of which the following is a specification.

My invention relates to devices for preventing the twisting of the line in hoisting apparatus; and the object of my invention is to provide a connection between the block and the standing part of a fall-line or between a purchase-ring on a boom and the standing part of a fall-line or other convenient position whereby a swivel connection will be obtained which will permit a rotation of the yoke A, thereby allowing the twists which are formed in the line by its constant use to be released by the rotation of the yoke A, which will allow the falls or tackling to hang in a normal position, thereby allowing them to be readily overhauled and to prevent a consequent breaking of the strands of the line or cable. I accomplish this object by means of the mechanism illustrated in the accompanying drawings, in which—

Figure 1 is a vertical section, partly in elevation. Fig. 2 is a side elevation; Fig. 3, a vertical section of a modified form. Fig. 4 is a front elevation of a block and cable supplied with my invention. Fig. 5 shows my invention when secured to a purchase-ring.

Similar letters refer to similar parts throughout the several views.

A yoke A is provided with a thimble B, to which the line or cable C is secured, the thimble being secured to the yoke by means of the bolt D and nut *d* or in any suitable manner. For the purpose of engaging the block E or purchase-ring P or other suitable apparatus I construct the yoke G, which may be secured to the tail of the block E by means of the bolt H, passing through the opening *h*, or, if desired, and the block is so constructed, the tail of the block may be passed between the two parallel portions of the yoke G and be secured within the opening *g* by means of a bolt passing through the bolt-holes *h*.

In order to secure the yoke A to the yoke G in such a manner that the yoke A may be readily rotated in connection with the yoke G, offering the minimum amount of friction in such rotation, I arrange a plate J, carrying bolt K, which passes through one end of the yoke A and is threaded to mesh with threads in the end of the yoke G, and when it has reached its position therein it is prevented from becoming loosened by means of the pin *k* passing through the head of the yoke G. In the surface of the plate J, adjacent to the surface of the end of the yoke A, I place an annular groove capable of receiving a series of friction-balls L, which engage with corresponding groove in the surface of the end of the yoke A, adjacent to the plate J. As thus arranged the yoke A will rotate about the bolt K, attached to the yoke G, with very little friction or resistance, and the twist which is formed in the line C by its constant use will be released and its effect counteracted, no detrimental results will ensue, and the line will be allowed to hang in a normal position and the progress of the work of hoisting be greatly accelerated, the efficiency of the force employed increased, and the expense attending the operation decreased.

I have shown in Figs. 1 and 2 the bolt K, secured to the plate J, threaded to mesh with corresponding threads in the end of the yoke G. It is apparent that I may reverse this manner of attaching the plate J and the yoke G, and I have shown a modified form in Fig. 3 for making this connection. In this modified form I take a plate J', into which I bore or form a central opening adapted to receive a bolt K', which is secured to or formed integral with the end of the yoke G'. Between the plate J' in the lower surface in the end of the yoke A', I place a series of rollers or balls L', the bolt K' being secured by suitable pin *k'*, and the operation of the apparatus is the same as that described, and illustrated in Fig. 1.

In Fig. 5 I show my device used with a purchase-ring P on the boom N, to which the yoke G is secured, the block E being placed between the yoke A and the sheave O.

Of course it is immaterial whether the cable C is constructed of wire, rope, or of any particular material, and I do not limit myself to the position in which my device is placed.

What I claim as my invention, and desire to secure by Letters Patent, is—

1. In a hoisting apparatus; a yoke; a thimble secured therein; a plate; a bolt secured thereto; a yoke to which said bolt is secured; a hoisting-block; a means for securing the tail of said hoisting-block to said last-mentioned yoke, substantially as described.

2. In a hoisting apparatus; a yoke; a thimble secured therein; a bolt passing through one end of said yoke; a second yoke to which said bolt is secured, substantially as described.

3. In a hoisting apparatus; a yoke; a thimble secured therein; a plate; a bolt connected with said plate; a series of friction-balls; a second yoke to which said bolt is secured, substantially as described.

4. In a hoisting device, two yokes; a cable secured to one of said yokes; a hoisting-block to which the other of said yokes is secured; a means for connecting said yokes, in such a manner that they may rotate upon each other.

5. In a hoisting apparatus; two yokes; a cable secured to one of said yokes; a hoisting-block secured to the other of said yokes; a swivel connection between said yokes, substantially as described.

6. In a hoisting apparatus; two yokes; a cable connected with one of said yokes; a plate; a series of friction-balls and a bolt connecting said yokes, forming an antifriction engagement between the two, substantially as described.

7. In a hoisting apparatus; a yoke; a cable secured thereto; a plate; a series of friction-balls placed between the plate and one end of said yoke; a second yoke carrying a bolt adapted to engage said plate, substantially as described.

Signed at Albany, New York, this 4th day of February, 1905.

PATRICK J. FAHEY.

Witnesses:
FREDERICK W. CAMERON,
LOTTIE PRIOR.